Fig. 1.
SO2 Treatment of Rosin
Hübl Iodine Number vs Temperature
At 1-2% SO2 hr. for 4 hours Feb. 19, 1946.                M. L. KALMAN                 2,395,278
                      TREATMENT OF ABIETYL COMPOUNDS
                           Filed July 3, 1943              2 Sheets-Sheet 2

Fig. 2.
SO₂ Treatment of Wood Rosin
Number vs % SO₂/hr.
For 4 Hours at 225° C.

INVENTOR
Nicholas L. Kalman
BY
ATTORNEYS

Patented Feb. 19, 1946

2,395,278

UNITED STATES PATENT OFFICE 2,395,278

TREATMENT OF ABIETYL COMPOUNDS

Nicholas L. Kalman, Rutherford, N. J., assignor to Ridbo Laboratories, Inc., Paterson, N. J., a corporation of New Jersey Application July 3, 1943, Serial No. 493,442

7 Claims. (Cl. 260—103)

This invention relates to a process for treating abietyl compounds, such as rosin and many other related materials mentioned hereinafter, and also to the products secured by such treatment. For convenience the specification has been arranged in sections, with numbered paragraphs, as follows:

| | Paragraph Nos. |
|---|---|
| I. General field and statement of objects | 1–19 |
| (a) The invention and its general purpose | 1 |
| (b) Brief statement of process | 2 |
| (c) Known uses of abietyl compounds | 3 |
| (d) Disadvantages of instability | 4–5 |
| (e) Advantages of process and product | 6–17 |
| (f) Making derivatives from treated products | 18 |
| (g) Concurrent treatments | 19 |
| II. Abietyl compounds | 20–38 |
| (a) Abietic acid described as an illustrative starting material | 20–22 |
| (b) Structure of abietic acid | 23–24 |
| (c) Instability apparently due to unsaturation | 25 |
| (d) Process decreases unsaturation | 26 |
| (e) Process applicable to many abietyl compounds; examples given | 27 |
| (f) Process applicable to production of stable abietyl compounds of many types, and formulae | 28–31 |
| (g) Specific examples of abietyl compounds | 32–38 |
| III. Treatment procedure | 39–52 |
| (a) Effect of temperature variation | 40–46 |
| (b) Effect of variation in rate of $SO_2$ | 47–50 |
| IV. Theoretical explanation | 53–60 |
| (a) Probable effects of the treatment | 53–56 |
| (b) Constituents probably present in treated material | 56–59 |
| V. Some treatments which may follow $SO_2$ treatment | 61–66 |
| (a) Distillation | 62–64 |
| (b) Sulfonation | 66 |
| VI. Some variations in treatment procedure | 67–68 |
| VII. Examples | |

| | Ex. No. | Table No. |
|---|---|---|
| (a) Application of treatment to different abietyl compounds | 1–11 | Ia–Ib |
| (b) Concurrent $SO_2$ treatment and change in form of compounds | 12–15 | |
| (c) Making derivatives of treated materials | 16–22 | |
| (d) Effect of temperature variation | 23–32 | IIa–IIb |
| (e) Effect of variation in rate of $SO_2$ | 33–38 | III |
| (f) Color and melting point | | IVa–IVc |
| (g) Oxidation tests | | V |
| (h) Alternative treatment procedures | 40–42 | |
| (i) Separation and purification | 43–49 | |

GENERAL FIELD OF INVENTION AND STATEMENT OF OBJECTS

1. Stated very generally, it is the object of this invention to produce abietyl compounds, such as rosin and many other related materials, having exceptionally high stability, especially as against oxidation, the process of treatment being simple and inexpensive, so that the invention can readily be adopted commercially. What is meant by the term "abietyl compounds" is fully elaborated hereinafter.

2. Briefly described, the process of the present invention involves heating of the compound to an elevated temperature while subjecting it to the action of sulfur dioxide ($SO_2$), this gas being readily available and inexpensive and also easily handled, all of which factors contribute to the commercial practicability of the treatment process. Surprisingly, I have found that this novel treatment extensively decreases the instability which is characteristic of abietyl compounds in general. Usually, in the practice of the invention, the unsaturation which is characteristic of abietyl compounds in general, is also extensively reduced.

3. It has long been recognized that rosin, rosin acids, and derivatives thereof potentially constitute a very large store of inexpensive raw materials for multitudes of purposes. Indeed, rosin and many other abietyl compounds have been employed on a large scale for a number of purposes, for instance, in paper sizing, in soap manufacture, in the paint and varnish industry, in printing inks, in lacquers, in alcohol surface coating compositions of the shellac type, and in other coating compositions, and also in making synthetic resins. They have also been used for many other miscellaneous purposes, such as in chewing gum, lubricants, and linoleum.

4. However, for a great many purposes, including various of those mentioned above, the characteristic instability of abietyl compounds has been a distinct disadvantage. Among the more troublesome disadvantages are the ready oxidizability of abietyl compounds in general.

5. The foregoing and other disadvantageous characteristics have made it impracticable from the commercial standpoint to employ rosin for multitudes of purposes to which the material is otherwise well suited, for instance as plasticizers and extenders in cellulose ester and ether compositions, in natural and synthetic resins, in natural and synthetic rubbers, and in other coating compositions and plastics.

6. The degree of stability imparted to abietyl compounds by treatment in accordance with the present invention is so marked, that such compounds treated according to the present invention may be employed for many purposes for which it has not been practicable to use such materials heretofore. The improvement in stability provided by the present invention is also of enormous benefit in many situations where rosin or other abietyl compounds are at present being employed.

7. Still further, the process of treatment provided by the invention is exceptionally attractive from the standpoint of cost of materials, and of equipment and labor required, the process being so economical as to make its application commercially feasible in the treatment of abietyl compounds to prepare them not only for many uses where such materials are at present used but also for multitudes of other uses for which it is impractical to employ prior treated rosin materials.

8. Although the process of the invention need not always be carried out under the optimum conditions (with respect to decrease in unsaturation and increase of stability), it is highly important, that according to the invention, various abietyl compounds can be rendered stable to such a degree, that for practical purposes, the treated products are substantially completely stable.

9. Another advantage of the present invention is the fact that the process of treatment to increase stability may be carried out without degrading the materials being treated. In fact, quite often the treatment yields a product of enhanced purity when compared with the same untreated starting material. The process may be carried out in a manner to retain various of the desirable characteristics of the abietyl compounds treated, so that, for example, a given material of given consistency, acid number, ester number, cation content, etc., may be treated to increase its stability without appreciably altering such characteristics as consistency, acid number, ester number, or cation content.

10. It is also of great importance that according to the present invention certain properties other than stability may also be improved to an appreciable extent. For example, it is possible according to the invention to secure products of noticeably lighter color than the starting material and also of markedly increased melting point, this latter improvement being especially effective in the case of treatment of gum rosins.

11. The glaring disadvantages of instability have long been recognized and numerous attempts have been made to overcome this difficulty. At best, the improvement effected by any of such prior treatments is distinctly limited, and in general, requires the employment of expensive equipment and/or expensive catalysts, as well as complicated and delicate treatment procedure.

12. Beyond the foregoing, I have found that the products produced in accordance with prior methods attempting to improve stability, show improvement to only a limited degree such that the process of the present invention when applied thereto will further improve the characteristics to quite a surprising extent, as is demonstrated more fully hereinafter.

13. Still further, various of the prior processes intended to improve stability have been subject to other disadvantages. For example, certain prior treatments, although accomplishing some increase in stability or decrease in unsaturation have at the same time so altered the abietyl molecule as to impair at least some desirable properties and characteristics of the abietyl compound. To illustrate, certain heat treatments have been employed heretofore in an effort to increase the stability of abietyl compounds such as rosins, but such heat treatment, particularly at the temperatures proposed for this purpose, tends to substantially decarboxylate the molecule and thus to reduce the acid value of the treated compound. Ordinarily, when treating various abietyl compounds, such as rosin or rosin acids, it is advantageous to avoid any considerable decarboxylation.

14. Other objects and advantages are the production of partially aromatized abietyl compounds without extensive diminution of acid or ester number, or cation content, and also the production of products having increased melting point and lighter color, as compared with the corresponding values of the same untreated starting material.

15. The invention also has as an object, the production of partially aromatized abietyl compounds in unusually high percentage yields and concentrations.

16. According to the invention a simple and effective process is provided for securing dehydroabietic acid and/or its derivatives.

17. It is also an object to produce products which may readily undergo reactions of aromatic compounds. For instance, the products may be sulfonated, thereby yielding stable sulfonates, high sulfonate yields being obtainable.

18. Moreover, various of the $SO_2$ treated materials may readily be converted from one form to another. For instance, a stabilized rosin or rosin acid may be esterified or converted into a salt or an alcohol, thereby yielding a stabilized rosin ester, salt or alcohol. In this way, a given derivative may readily be prepared in stabilized condition, even where that particular derivative may not conveniently be directly treated with $SO_2$ in that form.

19. In at least a number of instances it is possible, and in fact quite effective, to treat a given compound with $SO_2$ and concurrently to subject that compound to another treatment to change the form of the compound being treated. For instance, a rosin acid may be treated with $SO_2$ and concurrently with an alcohol or a metal to convert the acid to an ester or a salt.

ABIETYL COMPOUNDS

20. In considering the nature of the abietyl compounds to which the invention is applicable, reference is first made to one typical or representative compound belonging to this general class, i. e., abietic acid.

21. Abietic acid is commonly considered to be the major constituent (usually about 90%) of at least most of the commercially available rosins although this acid as such, is not ordinarily present in substantial amounts in the original raw materials from which wood and gum rosins are derived, but is formed during the process of separating the rosin.

22. Abietic acid (and also most other rosin acids) is an alkylated hydroaromatic derivative of 1-methyl-7-isopropyl-phenanthrene. It has an additional methyl group, probably in position 12, and a carboxyl group in position 1, having the empirical formula—$C_{19}H_{29}COOH$. This empirical formula, in fact, is typical of rosin acids.

23. The commonly accepted structural formula for abietic acid is given just below, this formula being considered as typical of the general structure of nearly all rosin acids.

24. For convenience in considering the structural formulae herein, the commonly accepted system of numbering has been indicated on the structural formula above.

25. The instability of compounds represented by the structural formula just above is believed to be due to unsaturation, it being noted that the molecule possesses two double bonds, which (according to latest postulations) are located, respectively, in ring II between positions 7—8, and in ring III between positions 9—14. It is believed that the existence of two double bonds in the molecule represents a degree of unsaturation such that the compound is highly unstable.

26. The process of the invention is applicable to the treatment of abietic acid and is capable of effecting extensive decrease in unsaturation thereof; the treated product further being found to have exceptionally high stability. It is only very difficultly oxidizable in air.

27. The process of the invention is also applicable to all similar abietyl compounds, such as other rosin acids or products containing rosin acids, for instance, rosins, typical examples of which are gum or wood rosins, such rosins being of American, French, Spanish, Portuguese, Greek, etc., origin. The invention is applicable to natural or isomerized rosin acids, such as abietic acids, pimaric acids, sapinic acids, sapietic acid, colophonic acids, Steele's abietic acid, pyroabietic acid and other heat treated rosin acids, etc. Still further, the invention is applicable to chemically treated rosin acids and/or rosins, such as hydrogenated rosin acids, palladium or iodine treated rosin acids, polymerized rosin acids, and rosin acids obtained by various other treatments, examples of which are mentioned above and also hereinafter. The invention is similarly applicable to the derivatives of such acids, especially esters and salts.

28. Thus, the present invention is capable of producing stabilized abietyl products of a multitude of types, such for instance, as gum and wood rosins, rosin acids, salts and esters of rosins and rosin acids, rosin alcohols, and rosin ethers. According to the invention, almost any abietyl compound may be produced in stabilized form, either by directly treating the compound in that form or by concurrently treating the compound with SO₂ and in some other way to change its form, or by treating one compound and thereafter converting its form to that desired. At least most of the stabilized abietyl compounds which may be produced according to the invention may for convenience be represented by the following general formula (C representing carbon, wherever it appears either in the diagram or in the key definitions which follow):

Wherein:
A = A bivalent element or group selected from the class consisting of O, S, H₂, NX; X being a hydrogen atom or a monovalent organic radical;
R = A monovalent element or group selected from the class consisting of O-metal, O—NH₄, halogen, OX, SX, NXX; X again being hydrogen or a monovalent organic radical.

29. The foregoing general formula is considered as applying to partially decarboxylated rosins and partially decarboxylated rosin acids, so long as such materials are not fully decarboxylated.

30. Certain of the products coming within the scope of the general formula above are preferably produced by first treating an abietyl compound in one form and then converting its form, rather than by directly treating the material in the form finally desired. The SO₂ treatment process of the invention, however, may be directly applied to a large number of abietyl compounds. The types of abietyl compounds to which the SO₂ treatment is especially well suited may be represented by the following general formula:

Wherein:
D = One or two double bonds
R = A member selected from the class consisting of hydrogen and an organic group selected from the class consisting of alkanes, alkenes, aryls, aralkanes, and aralkenes.

31. According to the foregoing, the starting material may have one or two double bonds, the exact locations of which are uncertain. With respect to the unsaturation of these compounds, it may be pointed out that in certain abietyl compounds the unsaturation and consequent instability may not be as great as with abietic acid, which was mentioned above as a typical abietyl compound. Thus, for example, certain of the prior treatment processes mentioned above (for instance, hydrogenation, polymerization or disproportionation) effect more or less decrease in unsaturation. Since such prior treatments yield products still retaining some unsaturation, even these treated products are advantageously further treated by the process of the present invention.

32. Examples of specific materials or compounds which may be secured in stabilized form are given just below:

33. Rosins and rosin acids (in more or less natural state, i. e., not chemically treated) such as WW wood rosin, WW gum rosin, FF wood rosin, copals (especially fossil copals), abietic acid, pyroabietic acid, etc.

34. Metallic and other salts of rosins or rosin acids, such as those of sodium, calcium, zinc, lead, cobalt, manganese, aluminum, ammonia, amines and quaternary bases.

35. I may also prepare rosin esters, ethers and ester-ethers of various types in stabilized form, such for instance as those made with alcohols, alkylolamines, and phenols.

36. Rosin alcohols are still another class of abietyl compounds which may be prepared according to my invention.

37. Such rosin alcohols may be esterified with a variety of acids such as straight chain or cyclic acids, including the rosin acids such as those mentioned above. Such acids may or may not have substituents. In the final products the rosin acid or the rosin alcohol or both may have been treated according to my invention. Inorganic acids such as $H_2SO_4$, and $H_3PO_4$ or the organic derivatives of the same, where at least one hydrogen is free may also be used as acylating agents.

38. Finally, with reference to the starting materials which may be treated according to the present invention, it should be noted that the abietyl compounds may be treated either alone, or in admixture with other materials. For instance, the rosin or rosin acids present in crude turpentine or in tall oil, may be stabilized by $SO_2$ treatment of these composite materials. Since the reaction involved is a reaction on the abietyl molecule, that reaction takes place wherever the abietyl molecule is present, provided of course, that the physical or chemical state or "environment" of the molecule is not such as to prevent the reaction from taking place, or is at least such as will not appreciably impair the stabilization of the abietyl constituent.

TREATMENT PROCEDURE

39. As above mentioned, the treatment of the present invention involves heating the abietyl compound to be stabilized and bringing $SO_2$ gas into intimate contact with the heated compound, preferably by bubbling the gas through the material being treated.

40. In considering the treatment temperature, reference is made to the graph of Figure 1. The curves of this graph were plotted from numerous examples all of which were carried out under essentially similar conditions, except for variation in temperature. In this graph curves are illustrated for WW wood rosin and also for WW gum rosin. Curves A and B represent drop in iodine number for treatment at various temperatures of WW wood rosin and WW gum rosin, respectively. The curve marked C, D represents the acid number of the treated products and while there were minute variations as between the wood rosin products and the gum rosin products, the differences were so small that the two curves for practical purposes coincide and are therefore shown by only a single curve.

Figure 1:
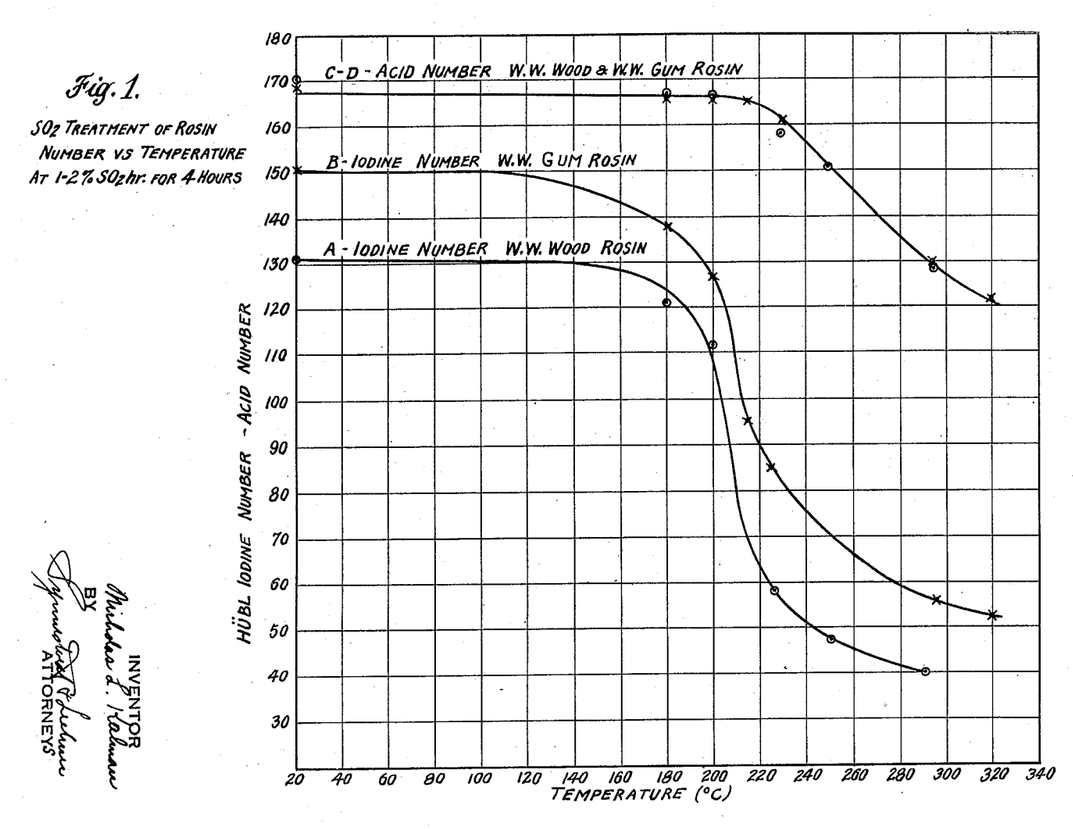

41. In the case of each example from which the curves were plotted, the rosin was heated for a period of 4 hours, while bubbling $SO_2$ therethrough at a rate of about 1–2% per hour, i. e., 1–2% of $SO_2$ by weight with reference to the weight of material being treated. In each example, $SO_2$ gas was bubbled through the material during rise in temperature to the values selected for the particular 4-hour treatment.

42. Referring now to Figure 1, it is first noted that the temperatures have been placed on the horizontal axis, the vertical axis being used both for acid number and iodine number (Hübl), since these latter two are readable on the same scale. The first 4-hour treatment represented in the graph is a treatment made at 180° C.

43. With the foregoing in mind, attention is now called to the iodine number curves which plainly show that above about 200° C. the 4-hour treatment effects extensive decrease in iodine number, there being a very sharp drop in the curves in this region. Increasing the temperature above about 230° C. to 240° C. does not extensively improve the drop in iodine number secured in 4 hours, particularly with the wood rosin, although appreciable drop takes place even up to values in the neighborhood of 300° C. From the standpoint of decrease in iodine number, therefore, the temperature is preferably above about 200° C.

44. Turning now to the acid number curve, it will be observed that virtually no change in acid number takes place even up to about 215–220° C. Moreover, extensive decrease in acid number is not manifested in a 4-hour treatment until the treatment temperature is increased to a point above about 230–250° C.

45. Having in mind the desirability for most purposes of maintaining a relatively high acid number when treating an acidic material, it will be seen from the above that the preferred temperature range in which extensive decrease in iodine number is attainable with virtually no loss in acid number, extends from about 200° C. to 230° C., and even up to about 250° C. does not appreciably reduce the acid number. It should be kept in mind, however, that in instances where some appreciable drop in acid number is not objectionable, the treatment temperature may be higher than the preferred range just mentioned. In fact, I have found that useful results from the standpoint of reduction in iodine number are attainable over quite a broad range of temperatures extending from about 170° C. up to about 325 or even 350° C., although, as above mentioned, it is of advantage for most purposes that the temperature be kept below that point at which appreciable decarboxylation occurs (in the case of an acidic compound, such as the commercial rosins). Nevertheless, where simultaneous stabilization and decarboxylation are desired, a stabilized hydrocarbon may be produced by employing a temperature above about 250° C.

46. The factors and curves above described are generally similar when applying the treatment to esters or salts, and in the case of any of these materials (acids, esters, or salts) it may be said that wherever decarboxylation is to be avoided the temperature preferably should not be so high as to cause extensive loss of the oxygen-containing substituent at the 1-position of the molecule.

47. Attention is now called to the graph of Figure 2. The examples from which the curves of this graph were plotted were all conducted under essentially the same conditions except for variation in the percent of $SO_2$ passed through the material being treated during each hour at the treatment temperature. WW wood rosin was employed in each example and in each case the material was heated to 225° C. for 4 hours. The percent (by weight) of $SO_2$ per hour is indicated on the horizontal axis, the iodine number (Hübl) and acid number again being shown on the vertical axis.

Figure 2:
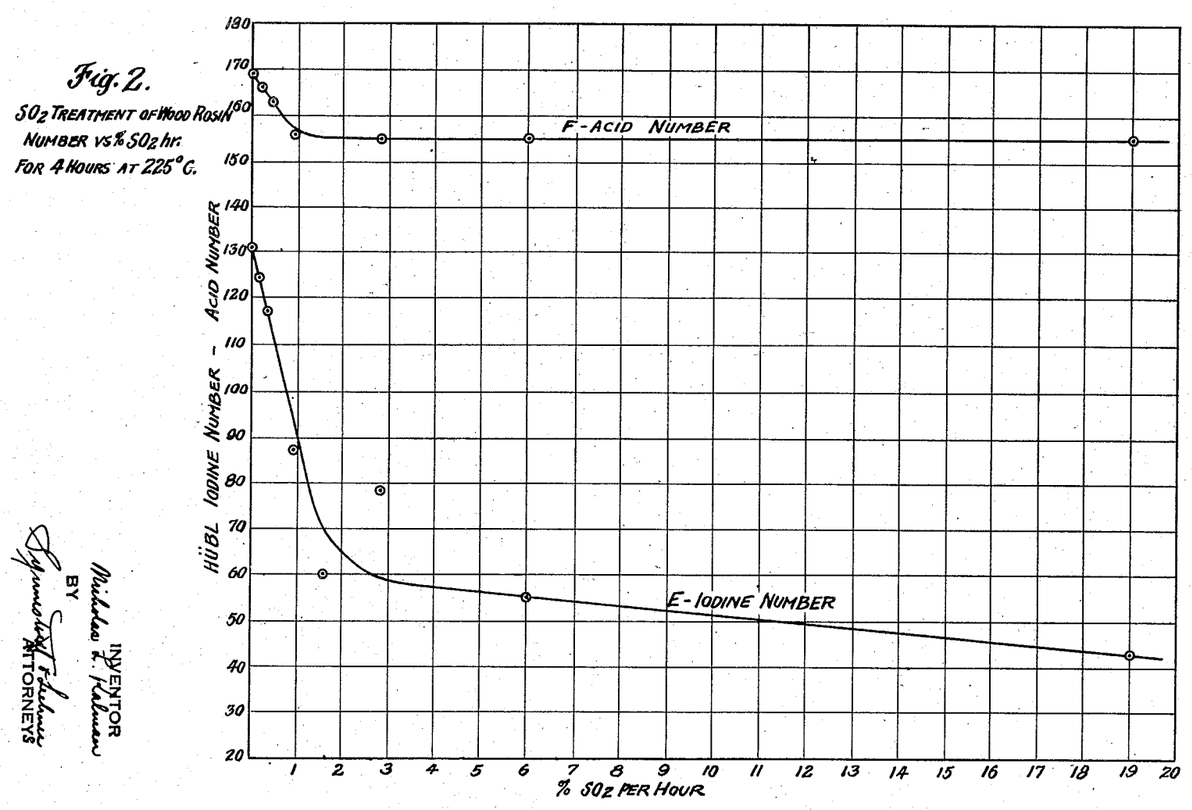

48. The iodine number curve E of Figure 2 shows that even very low percentage rates of $SO_2$ are effective to extensively decrease the unsaturation at 225° in 4 hours. In fact, the extent of decrease in iodine number is quite marked even with as little as from 0.5 to 1% of $SO_2$ per hour. The shape of the iodine number curve is unusually striking, since quite close to the maximum attainable decrease in iodine number may be secured by as little as about 3% of $SO_2$ per hour, or even less.

49. The acid number curve F of Figure 2 shows that after a very inconsequential decrease in acid number, no further decrease occurs, regardless of the quantity of $SO_2$ passed through the material being treated.

50. From Figure 2, it will be seen that almost any rate of $SO_2$ flow through the material is effective to extensively decrease the iodine number. The preferred range according to the invention is from about 0.5% to about 5% of SO₂ per hour.

51. In connection with the treatment conditions, it is to be noted that under at least most of the usable conditions of temperature and percentage of SO₂, it is possible to control the time of treatment so as to yield products of color at least as light as and frequently lighter than the same untreated material. Surprisingly, an improvement in color may be secured even with pretreated commercial rosin materials, such as "Polypale" resin. Similarly, products of increased melting point may be secured under most conditions, providing the time is appropriately selected and provided also that the temperature and time are not such as to cause appreciable loss of the oxygen-containing substituent at the 1-position of the molecule.

52. Turning now to the time of treatment, it may be mentioned that increase of time, with a given temperature and rate of SO₂ tends to increase the extent of iodine number drop. Under any given conditions, it is preferable that the time be sufficient to lower the iodine number at least to a point below about ¾ that of the original untreated material, and most desirably to about ½ or lower.

THEORETICAL EXPLANATION

53. While at least some portions of the theoretical explanation relating both to the character of the materials here under consideration and also to the nature of the treatment process may not be capable of statement with assurance, I believe that what is herein presented by way of theoretical explanation is correct and may be of assistance in teaching one how to practice the invention. In any event, whether correct or incorrect, the actual results and improvements herein disclosed, may be secured by following the procedural steps taught.

54. So far as I have been able to determine, the exceptionally high degree of stability possessed by many of the products treated in accordance with this invention is due at least in part to extensive reduction in unsaturation and to partial aromatization.

55. I believe that during the treatment with SO₂, partial dehydrogenation may take place, forming a third double bond, and that the three double bonds then present in the molecule may re-arrange into one ring, thus aromatizing that ring. The action of the SO₂ may be of a catalytic nature, or possibly several different actions are simultaneously involved, such as catalytic action and partial dehydrogenation.

56. In any event, the treatment effects decrease in unsaturation, probably with accompanying inter- and/or intra-molecular re-arrangement, yielding a product at least some constituents of which have an aromatized ring or molecule which may be considered as "saturated", in the sense that it does not possess olefinic unsaturation. Depending on various factors, and especially on the extent of decrease in unsaturation, many of the products will contain at least two major constituents, one of which is partially aromatized and the other of which is olefinic.

57. I believe that products treated in accordance with my process contain as a major or large constituent, a partially aromatized rosin acid, probably dehydroabietic acid ($C_{19}H_{27}COOH$) which may be represented by the following structural formula (here given without the position numbers and without the carbon atoms in the rings).

58. Comparison of the structural formula just above with the corresponding formula for abietic acid at once discloses that the primary difference between the two molecules is that in the case of dehydroabietic acid, three double bonds appear in one of the three rings, this individual ring being, therefore, aromatized.

59. Still further constituents may be present, such as unconverted and/or isomerized rosin acids, particularly where the reaction is not carried out under optimum conditions. Still other compounds may be present, such as hydrogenated rosin acids and polymerized constituents.

60. Whatever the exact nature of the several constituents present in the treated material, it should here be noted that the extensive decrease in unsaturation of the compound as a whole is effected by treatment with SO₂ in the manner fully described above. Moreover, the treatment is capable of increasing melting point and improving the color of various abietyl materials.

TREATMENT WHICH MAY BE EMPLOYED FOLLOWING SO₂ TREATMENT

61. Any of the abietyl compounds which have been treated in accordance with the foregoing may be further processed in still other ways, as by distillation.

62. Distillation is advantageously applied to many of the treated compounds, such distillation being useful for several different purposes. For instance, distillation may be resorted to for the purpose of separating components of the treated materials. Again, such distillation is advantageous in securing lighter colored products, the constituents of dark color, when present, remaining in the residue. It is further of use in enhancing purity, acid number, ester number, melting point, etc. If desired, the treated materials may be subjected to fractional distillation, either in one stage or repeated.

63. With regard to distillation, it may be noted that the residue of distillation usually comprises a resin-like-material having unusually high melting point, and such materials are of use for a number of commercial purposes. Such residues apparently contain at least some appreciable polymerized constituents and frequently have an acid value somewhat lower than the original material, for instance in the neighborhood of about 140 or lower.

64. In the case of fractional distillation, highly valuable fractions may be obtained. Thus, distillation of various SO₂ treated rosins yields an initial fraction which is liquid, this being followed by a fraction having a melting point in the range of gum and wood rosins.

65. Various constituents of the treated materials may be separated according to a number of different ways, for example by using physical and/or chemical means, such as solvent extraction, fractional precipitation, crystallization, chemical reaction, such as sulfonation, and by other means.

66. In connection with sulfonation, it may be mentioned that in instances where the SO₂ treated material contains dehydroabietic acid, that acid may be separated by sulfonating the treated material, and then separating the sulfonic acid of dehydroabietic acid, in a more or less pure form. This may then be hydrolyzed into dehydroabietic acid, the invention thereby providing a simple and effective method for obtaining dehydroabietic acid and/or its sulfonic acid derivative, and also derivatives of either.

SOME VARIATIONS IN TREATMENT PROCEDURE

67. The SO₂ treatment may be performed under a number of different treatment conditions, either batch-wise or continuously, for instance with counter-current flow, and in any case any unused SO₂ may be recycled. It may be carried out in an open or closed reaction vessel, at atmospheric pressure. If desired, however, pressures other than atmospheric may be employed, for instance superatmospheric pressure, or even somewhat reduced pressure, although in the latter case the conditions should not be such as to cause excessive loss of the rosin constituent prior to completion of the reaction.

68. The abietyl compound and the SO₂ may be the only materials present during the reaction, or alternatively, SO₂ treatment may be performed in a solvent, which solvent may be a solvent for the abietyl compound, or for the SO₂, or for both. Wherever this alternative is employed, such solvents should not be such as to interfere with the intended reaction. Saturated petroleum hydrocarbon solvents and certain of them having comparatively low unsaturation, may be used for this purpose. Because of their chemical characteristics and also because of their relatively low cost, suitable petroleum hydrocarbons constitute preferred solvents. Moreover, other solvents such as chlorinated hydrocarbon solvents, for instance chlorinated benzene may be used.

EXAMPLES

In connection with the examples given in this group and also others hereinafter, it may be mentioned that unless otherwise indicated all of the iodine numbers given were secured by the Hübl method. In addition, all temperature figures are given in degrees centigrade. Melting point determinations were made by the mercury method, unless otherwise indicated.

SO₂ Treatment Applied to Different Materials

Comparative Examples 1 to 11

In this first group of examples the SO₂ treatment process was applied to a number of different abietyl compounds and materials, including acidic materials, esters, salts, and also composite materials containing rosin acids.

The treatment conditions for each of Examples 1 to 11 were similar, although with some of the materials the temperature employed was different than that used with others, as is indicated in the tables. There were also certain other differences between examples, as will be brought out. With the exception footnoted on Table Ia below, all of the materials were treated with from about 1 to 2% of SO₂ per hour at the treatment temperature. The time of treatment at the temperature indicated was in the range from about 4 to about 5 hours. In all cases the SO₂ was bubbled through the material from the start of the treatment.

The effect on iodine number is indicated in Table Ia just below, the effect on acid number and melting point being shown by Table Ib.

*Table Ia*

| Ex. | Material | Temp., °C. | Iodine number (Hübl) | | |
|---|---|---|---|---|---|
| | | | Untreated | Treated | Percent decrease |
| 1 | WW wood rosin | 225 | 131 | 70 | 47 |
| 2 | WW gum rosin | 225 | 152 | 48 | 68 |
| 3 | "Staybelite" | 295 | 65 | 38 | 41 |
| 4 | "Galex" | 295 | 66 | 29 | 56 |
| 5 | Ester gum C | 295 | 90 | 28 | 69 |
| 6 | "Abalyn" (methyl ester) | 295 | 97 | 34 | 65 |
| 7 | "Zirex" (zinc soap) | 295 | 79 | 62 | 21 |
| 8 | Sodium soap [1] | 225 | 131 | 72 | 45 |
| 9 | Crude tall oil | 225 | 130 | 62 | 52 |
| 10 | Tall oil distillate [2] | 225 | 98 | 86 | 12 |
| 11 | Crude turpentine [3] | 225 | 207 | 116 | 44 |
| A | WW wood rosin (heated without SO₂) | 225 | 131 | 132 | ---- |

[1] SO₂ treated (in a solvent) in the form of the soap, but the iodine values are given for the WW wood rosin before the soap was made and for the rosin acids upon separation thereof after SO₂ treatment. (This example is further discussed below.)
[2] Crude tall oil heat treated at 300° C. and distilled before SO₂ treatment.
[3] Treated with about 7% SO₂/hr. instead of about 1-2% as in all other examples.

*Table Ib*

| Ex. | Material | Acid or ester number | | Melting point | |
|---|---|---|---|---|---|
| | | Untreated | Treated | Untreated | Treated |
| 1 | WW wood rosin | 168 | 158 | 81 | 81.5 |
| 2 | WW gum rosin | 167 | 157 | 80 | 94.5 |
| 3 | "Staybelite" | 164 | 151 | 73 | 69 |
| 4 | "Galex" | 160 | 121 | 70 | 43 |
| 5 | Ester gum C | [1] 153 | [1] 110 | 98.5 | 86 |
| 6 | "Abalyn" | [1] 163 | [1] 146 | ---- | ---- |
| 9 | Crude tall oil | 168 | 154 | ---- | ---- |
| 10 | Tall oil distillate | 165 | 157 | ---- | ---- |
| 11 | Crude turpentine | 123 | 136 | ---- | ---- |

[1] Ester number.

In connection with the above tables note the following:

The materials treated in Examples 3, 4, 6 and 7 were commercial products, as follows: "Staybelite" made by Hercules Powder Company; "Galex" made by G. & A. Laboratories; "Abalyn" made by Hercules Powder Company; and "Zirex" made by Newport Industries.

Table Ia showing extensive reduction in iodine number, indicates extensive decrease in unsaturation of the material being treated. Even various of the treated commercial products, such as "Staybelite" and "Galex" show very substantial improvement by treatment in accordance with the present invention.

With regard to the relatively low percentage decrease in iodine number in Example 10, it should be kept in mind that the material here undergoing treatment is a composite material previously partially stabilized, containing not only the abietyl constituent but also other constituents. Therefore, the percentage decrease in iodine number would not be expected to be as great as where the abietyl material is treated alone.

Referring to Table Ib it will be seen that under certain conditions only very small reduction in acid or ester number occurs as a result of the treatment. This is of importance, especially when treating esters or materials of acidic nature, in which it is usually desirable to maintain a relatively high ester or acid number.

Table Ib is further of interest in showing that the process may be carried out without decreasing the melting point of solid abietyl materials. In connection with this point special attention is directed to the melting point figures of Example 2, indicating that a gum rosin product may be obtained having a very marked increase in melting point, which is of great importance, as will be appreciated by those skilled in the art.

The noticeable decrease in acid number and melting point which occurred in Examples 3 and 4 is apparently due to the fact that these particular examples were carried out at a temperature (295° C.) such that some appreciable decarboxylation of the molecule occurred. This, of course, would be expected to effect at least some reduction in melting point. It may be noted that similar reduction in iodine number without, however, appreciable decrease in acid number and melting point, may be secured by treatment of these materials at a lower temperature for a longer time, and/or at a higher rate of $SO_2$ bubbling. Nevertheless, it is also contemplated in accordance with the present invention that where desired the treatment may be carried out under conditions effecting even greater decarboxylation than occurred in Examples 3 and 4.

From Table Ia and Ib above, it will be clear that the invention is applicable to a wide variety of materials.

CONCURRENT $SO_2$ TREATMENT AND CHANGE IN FORM

Several examples are given just below illustrating the adaptability of the present $SO_2$ treatment process to a situation where the material undergoing $SO_2$ treatment is simultaneously subjected to other treatment designed to change the form of the abietyl compound.

*Example 12*

In this example WW wood rosin was simultaneously treated with $SO_2$ and with sodium sulfite so as to produce a stabilized sodium soap.

500 grams of the rosin and 93 grams of anhydrous sodium sulfite were heated together for about 6 hours, during which time the temperature varied between about 220° and 250° C. During this treatment time $SO_2$ was continuously bubbled through the reaction mixture, at an average rate of about 0.5% per hour.

The untreated material had an original Hübl iodine number of 131 and an original acid number of 168. The corresponding values for the final product were: Hübl iodine number 40 and acid number 32. The product was a tan solid.

*Example 13*

This example illustrates simultaneous $SO_2$ treatment and formation of a zinc soap.

500 grams of WW wood rosin and 93 grams of zinc carbonate were heated for about 10 hours between about 275° and 300° C. During this treatment $SO_2$ was bubbled through the reaction mixture at an average rate of about 0.5% per hour.

The original wood rosin had an acid value of about 168 and an iodine number of about 131, and the final product had an acid number of about 3, an iodine number of 79, and was entirely soluble in benzol.

*Example 14*

This illustrates simultaneous $SO_2$ treatment and formation of the glycerine ester.

500 g. of WW wood rosin were heated with 54.5 g. of glycerine for about 5 hours between about 265° and 285° C. During this heat treatment $SO_2$ was bubbled through the material at an average rate of about 1% per hour.

The original rosin had an acid number of 168 and an iodine number of 131, which compared with an ester number of 140 and an iodine number of 84 for the treated material. The product was a hard brittle solid of quite a light color, being about 9–10 on the Hellige color scale, which compares with a color of about 15–16 for commercial ester gum C.

*Example 15*

This example illustrates simultaneous $SO_2$ treatment and decarboxylation. In this example WW gum rosin was heated for about 4 hours at a temperature of about 320° C. while bubbling $SO_2$ through the material at an average rate of about 1–2% per hour. At this temperature, appreciable decarboxylation apparently took place, the final product therefore containing a substantial amount of hydrocarbon, and the total product having a substantially reduced iodine number. The acid number of the product was 118 which compared with 167 for the starting material; and the iodine number of the product was 54, which compared with 152 for the starting material, i. e., a drop in iodine number of 64%.

The product of this example was further treated in the manner mentioned hereinafter in another group of examples.

DERIVATIVES OF $SO_2$ TREATED MATERIALS

*Example 16*

In this example WW gum rosin $SO_2$ treated at 225° C. was esterified with glycerine. 300 g. of the treated rosin and 41 g. of glycerine were heated for about 17 hours between 270° and 280° C. The $SO_2$ treated starting material had an acid value of 158 whereas the acid value of the final product was 8.6, the ester number being 170. The melting point was increased to 110° C.

*Example 17*

In this example the diethylene glycol ester was made with WW wood rosin $SO_2$ treated at 225° C.

200 g. of the treated rosin and 67.6 g. of diethylene glycol were heated for 22½ hours between 240° and 250° C., while stirring.

The ester was purified by elimination of the unreacted acidic constituent.

The $SO_2$ treated starting material had an acid number of 152 and an iodine number of 40, whereas the ester had a Carbitol saponification number of 153.5 and an acid number of 9.4, the iodine number being 33.

*Example 18*

This example illustrates the formation of the cetyl ester of $SO_2$ treated WW wood rosin. This was done by first making the acid chloride. The rosin here employed was $SO_2$ treated at 225° C.

200 g. of the treated rosin were mixed with 200 cc. of benzol and the solution placed in an ice bath. Thereupon 84 g. of thionyl chloride were added slowly, with stirring. The mixture was then allowed to warm to room temperature and the solvent was distilled off at about 80 to 90° C. under vacuum.

After distillation of most of the solvent, 165 g.

of cetyl alcohol and 200 cc. of pyridine were added to the acid chloride and heated for 2 hours on a steam bath, the product finally being cooled and purified by washing out pyridine and unreacted materials.

The ester so obtained was a waxy solid having an acid number of 1.3 and a Carbitol saponification number of 115.

*Example 19*

The sodium soap of $SO_2$ treated WW wood rosin was made by heating 200 g. of the treated rosin to 100° C. and then adding an aqueous solution of sodium carbonate comprising 57.5 g. of sodium carbonate and 287.5 cc. of water. During addition of the solution the temperature dropped to 70–80° C., after which boiling water was added to bring the volume of the mixture to 1 liter, the temperature then being close to 100° C.

Part of the soap solution was cooled, the resulting precipitate being filtered, washed with an aqueous 6% sodium chloride solution, and dried, yielding a light tan, soft doughy precipitate. The mother liquor was grained out by the addition of sodium chloride, thereby increasing the yield of soap.

*Example 20*

The lead soap of $SO_2$ treated WW wood rosin was prepared by taking an aliquot portion of the sodium soap solution referred to above in Example 19 and placed on a steam bath and stirred during addition of an aqueous solution containing 29.3 g. of lead acetate and 375 cc. of water (plus 5 cc. acetic acid). A white flocculent precipitate formed which was filtered and washed and then dried in vacuum, the final product being a creamy white powder.

*Example 21*

The calcium soap of $SO_2$ treated WW wood rosin was prepared by taking an aliquot portion of the sodium soap solution referred to above in Example 19 which portion was equivalent to 50 g. of soap. This was added slowly with stirring to 200 cc. of a warm aqueous solution of calcium chloride containing 11.3 g. of $CaCl_2, 2H_2O$ (a slight excess as compared with soap present). A flocculent tan precipitate formed which became a slimy paste. This was heated on a steam bath with 200 cc. of a 5% aqueous calcium chloride solution until the precipitate coagulated. This was filtered, washed and dried in vacuum, yielding a cream colored powder.

*Example 22*

In this example $SO_2$ treated WW gum rosin was further treated to decarboxylate the material, thereby converting at least a major portion thereof to a rosin hydrocarbon. 600 g. of the treated gum rosin and 6 g. of p-toluene sulfonic acid were heated at 290° C. for 3 hours. The final product had an acid number of 2.6, which compared with an acid number of 157 for the $SO_2$ treated starting material.

EFFECT OF TEMPERATURE VARIATION

In table IIa below there are given acid and Hübl iodine numbers for various examples carried out at different temperatures but under otherwise similar treatment conditions. In each case WW wood rosin was employed and $SO_2$ was bubbled through the material at an average rate of from about 1–2% per hour, the time of treatment being in the range from about 4 hours to about 5 hours.

*Table IIa.—WW wood rosin*

| Ex. | Temp., °C. | Iodine No. | Acid No. | Melting point |
|---|---|---|---|---|
| WW wood rosin untreated | | 131 | 168 | 81.0 |
| 23 | 180 | 121 | 165 | 85.5 |
| 24 | 200 | 102 | 166 | 84.0 |
| 1 | 225 | 70 | 158 | 81.5 |
| 25 | 250 | 37 | 150 | 80.5 |
| 26 [1] | 295 | 60 | 129 | 70.5 |

[1] This example heated for only about 2 hours instead of 4–5 hours as in all others.

In addition a similar comparative series of examples were carried out under essentially the same conditions (but under different temperatures) on WW gum rosin, the results of this group being given below in Table IIb.

*Table IIb.—WW gum rosin*

| Ex. | Temp., °C. | Iodine No. | Acid No. | Melting point |
|---|---|---|---|---|
| WW gum rosin untreated | | 152 | 167 | 80 |
| 27 | 180 | 126 | 163 | 90 |
| 28 | 200 | 115 | 164 | 85.5 |
| 29 | 215 | 83 | 162 | 88 |
| 30 | 225 | 49 | 152 | 88 |
| 31 | 295 | 48 | 129 | 72 |
| 32 | 320 | 54 | 118 | 65.5 |

It may be noted that at the higher temperatures, especially above 300° C., the acid number drops appreciably, apparently because decarboxylation occurs at such higher temperatures. This factor is apparently responsible for the decrease in melting point at the upper end of the temperature range. Nevertheless, it is especially to be noted that a very substantial increase in melting point is secured when operating in the neighborhood of from 180 to 225° C.

The figures given above should be considered in relation to the curves of Figure 1.

EFFECT OF VARIATION IN RATE OF $SO_2$

Analysis of various examples indicates that with respect to the quantity of $SO_2$ employed in the treatment, the extent of the reaction is in general proportional to the percentage of $SO_2$ bubbled through the material during each hour of treatment at a given temperature.

This is demonstrated by a group of examples given below in Table III. In each example tabulated WW wood rosin was employed and the treatment temperature was approximately 225° C. This group of examples should be compared with the curves of Figure 2.

*Table III.—WW wood rosin*

| Ex. | Rate %/hr. | Time (hrs.) at 225° C. | Iodine No. | Acid No. |
|---|---|---|---|---|
| WW wood rosin untreated | | | 131 | 168 |
| 33 | 0.2 | 4 | 120 | 163 |
| 34 | 0.4 | 5.5 | 119 | 163 |
| 1 | 0.9 | 4.5 | 70 | 158 |
| 35 | 1.6 | 6 | 40 | 155 |
| 36 | [1] 2.8 | 5 | 59 | 160 |
| 37 | 6.0 | 5 | 55 | 159 |
| 38 | 19.0 | 6 | 35 | 154 |

[1] Bubbling of $SO_2$ commenced only upon reaching the 225° treatment temperature. In all others $SO_2$ bubbling was commenced at the start.

COLOR AND MELTING POINT

Data regarding the effect of the $SO_2$ treatment on the color and melting point of WW wood rosin and WW gum rosin is given below in Tables IVa, IVb and IVc.

Tables IVa and IVc represent examples carried out at 225° C. while bubbling SO₂ through the material at an average rate of about 1-2% per hour. Table IVb represents an example at 250° C. In each case samples were taken at various times, as is indicated in the tables. The color and melting point of the several samples is indicated in the three tables.

*Table IVa.—WW wood rosin (225° C.)*

| Ex. | Time (hrs.) at 225° C. | Color (Hellige) | Melting point |
|---|---|---|---|
| Untreated | | 10-11 | 81 |
| 1a | (¹) | 13 | (²) |
| 1b | 2 | 12-13 | 82.5 |
| 1c | 4 | 13 | (²) |
| 1d | 5.5 | 9 | 81.5 |
| 1e | 6.5 | 11 | (²) |
| 1f | 7.5 | 11 | 83.5 |
| 1g | 9.5 | 11 | (²) |
| 1h | 11.5 | 14 | 86 |

¹ On reaching temperature.
² Not taken.

From the above it will be seen that the melting point is raised and further that under certain conditions, the color is lighter than the untreated material.

*Table IVb.—WW wood rosin (250° C.)*

| Ex. | Time (hrs.) at 250° C. | Color (Hellige) | Melting point |
|---|---|---|---|
| Untreated | | 10-11 | 81 |
| 25a | (¹) | 9-10 | 82 |
| 25b | 1 | 8 | (²) |
| 25c | 2 | 8 | 81.5 |
| 25d | 3 | 9-10 | (²) |
| 25e | 4 | 11 | 80.0 |
| 25f | 5 | 15-16 | 80.5 |

¹ On reaching temperature.
² Not taken.

From Table IVb it will be seen that substantial lightening of color took place.

Table IVc below also shows increase of melting point and lightening of color on treating WW gum rosin.

*Table IVc.—WW gum rosin (225° C.)*

| Ex. | Time (hrs.) at 225° C. | Color (Hellige) | Melting point |
|---|---|---|---|
| Untreated | | 11 | 80 |
| 30a | (¹) | 13-14 | 89 |
| 30b | 1 | 15 | (²) |
| 30c | 2 | 13 | 88 |
| 30d | 3 | 14 | (²) |
| 30e | 4 | 12 | 93 |
| 30f | 5 | 11 | 90.5 |
| 30g | 6 | 10 | 88 |

¹ On reaching temperature.
² Not taken.

The effect on melting point with gum rosin is quite exceptional, as can readily be seen from the table.

In connection with the color of the products, several points should be noted as follows:

In the first place, the effect on the color of gum rosin is somewhat different than the effect on wood rosin. Usually, a slight greenish tinge shows up in the gum rosin, whereas with the lighter samples of the wood rosin, a pale lemon yellow is quite usual. The green color in the treated gum rosin may be eliminated by purifying in a low-boiling petroleum hydrocarbon cut.

The color of products of this type may be viewed or analyzed from several different standards. Although the Hellige color scale which is employed in the tables above indicates no appreciable darkening in many of the samples and further shows definite reduction in color in some cases, it is pointed out that from the standpoint of color shading or actual appearance to the naked eye the improvement in color, especially in the case of wood rosin, is much greater than is indicated by the Hellige scale. This, of course, is of great importance for many purposes for which the products are useable. Many of the treated materials which on the Hellige scale show no lightening of color and in fact even some darkening, actually appear to the naked eye as being of distinctly lighter color or shade than the original material from which the product was made. For example, the product of Example 30f having a Hellige color of 11, appears to the naked eye as being of lighter color than the untreated material which has the same Hellige color.

OXIDATION TESTS

Various of the SO₂ treated materials were subjected to an accelerated oxidation test which was effected by dissolving the materials in suitable solvents and adding an oxidation catalyst, such as a soluble cobalt salt. The materials were then placed in a shaker under an initial pressure of 50 lbs. of oxygen, and shaken. When oxidation occurred the pressure correspondingly dropped and tests were continued until the pressure remained constant for at least several hours. After this, the material was removed from the shaker and the weight gain measured. From the pressure drop the weight of oxygen absorbed was calculated. This calculated amount was checked against the weight gain, and in most instances the results were found to check very accurately. In many cases where no evidence of oxidation was observed, the test was considerably extended, in order to make sure that oxygen absorption was not being retarded by an extended induction or lag period.

In accordance with the foregoing accelerated oxidation test, comparative figures were secured for the products of a number of examples given above, showing the induction period and the percentage (if any) of oxygen absorbed by the SO₂ treated material and also by the same material untreated. The results of these tests are given in Table V below, from which it will be seen that the improvement with respect to oxidizability is very extensive. Many of the treated materials indicated no tendency to oxidize even after very long periods of test.

Except for those examples footnoted, all examples in Table V were treated at about 225° C. and for a period of from about 4 to 5 hours.

*Table V*

| Ex. | Material | Rate SO₂ (%/hr.) | Induction period (hrs.) | Total time run (hrs.) | Per cent (wt.) oxygen absorbed |
|---|---|---|---|---|---|
| 33 | WW wood rosin | Untreated | 2 | 20 | 11.8 |
| 1 | do | 0.2 | 8 | 22 | 12.3 |
| 1h¹ | do | 0.9 | Over 90 | 90 | 0 |
| | do | 0.9 | Over 90 | 90 | 0 |
| 2 | WW gum rosin | Untreated | 2 | 22 | 12.0 |
| | do | 1-2 | Over 75 | 75 | 0 |
| 5 | Ester gum C | Untreated | 1.5 | 22 | 12.0 |
| | do | 1-2 | Over 75 | 75 | 0 |
| 39² | "Abalyn" | Untreated | 5.5 | 28 | 11.1 |
| | do | (Rate not determined). | Over 69 | 69 | 0 |

¹ Example 1h was a continuation of the same run as Example 1, the additional time of treatment being sufficient to make a total treatment time of 11.5 hours. (See Table IVa.)
² The material here tested was treated with SO₂ for about 13 hours at temperatures ranging between about 200° and 300° C.

ALTERNATIVE TREATMENT PROCEDURES

Example 8

This example is included in Table Ia above, but it is here pointed out that it further illustrates the carrying out of the $SO_2$ treatment in the presence of a solvent. The treatment was effected by suspending 90 g. of dried sodium rosinate in 400 g. of "Deo-Base" oil of the Sonneborn Co. (a saturated mineral oil).

After the $SO_2$ treatment, the sodium rosinate was filtered off and washed with petroleum ether. The dried soap was dissolved in water, and acidified with mineral acid. The liberated rosin acids were filtered off, washed with water and dried. Acid number was 175, Hübl iodine number 72, melting point on Fisher-Johns Block: softening at 81°, melting at 143° C.

Example 40

In this example $SO_2$ treatment of WW wood rosin was effected in the presence of a different solvent, i. e., stearic acid. The WW wood rosin and stearic acid were used in equal portions and the treatment was effected by bubbling about 2.4% (based on the rosin present) of $SO_2$ per hour of treatment. The temperature employed was about 225° C. and the total time of treatment was 5 hours.

After treatment, the solution had a Hübl iodine number of 19, which compared with an iodine number of 65 for the untreated solution. The acid number of the treated solution was 188, which compared with 190 for the untreated solution.

Example 41

This example illustrates carrying out the $SO_2$ treatment under pressure.

2000 g. of WW wood rosin were placed in an autoclave. 28 g. (1.4%) of $SO_2$ gas was introduced and the autoclave sealed.

The temperature was raised to about 225° C. and held there for about 2½ hours. During this treatment time the pressure varied between about 70 and 100 pounds per square inch.

Upon opening the autoclave no odor of $SO_2$ could be detected, although the presence of $H_2S$ was indicated.

The final product had an iodine number of 81 and an acid number of 160. It may be noted that this is similar to the corresponding values secured by treatment at atmospheric pressure.

Example 42

In this example crude turpentine was gradually heated to a temperature of about 200° C., under slight vacuum, in the presence of $CO_2$ for about 3 hours, so as to distill most of the turpentine, thereby leaving a material primarily consisting of gum rosin. Without cooling, $SO_2$ was then bubbled through at the rate of about 0.6% per hour, while maintaining the temperature at about 225° C., this treatment being continued for 5.75 hours.

The acid number of the product was 144 and the iodine number was 88.

The above illustrates the adaptability of the treatment to the process of making a stabilized gum rosin from crude turpentine in a continuous run, i. e., without successive re-heatings.

SEPARATION AND PURIFICATION

Example 43

WW wood rosin was heated for 6 hours at about 250° C., while bubbling $SO_2$ through the material at about 1–2% per hour. This treated material was fractionally distilled at about 2 mm. Hg. The first distillate included all material which came over up to about 200° C. and the second distillate came over between about 200° C. and 240° C. Analytical data with respect to the two distillates and the residue was as follows:

| | Acid No. | Iodine No. | Melting point |
|---|---|---|---|
| Material prior to distillation | 122 | 47 | 61.5 |
| 1st distillate | 75 | 70 | Liquid |
| 2nd distillate | 161 | 34 | 67.5 |
| Residue | 111 | 35 | 102.5 |

Example 44

The $SO_2$ treated product of Example 31 above ($SO_2$ treatment of gum rosin at 295° C.) was subjected to similar fractional distillation, the first cut coming over up to about 186° C. and the second between 186° C. and 240° C. Analysis showed the following:

| | Acid No. | Iodine No. | Melting point |
|---|---|---|---|
| Material prior to distillation | 129 | 48 | 72 |
| 1st distillate | 8.5 | 80 | Liquid |
| 2nd distillate | 171 | 37 | 79 |
| Residue | 127 | 42 | 106.5 |

From the above examples it will be noted that useful distillation fractions may be secured, such fractions having varying properties and characteristics, depending upon the temperature and other conditions of the $SO_2$ treatment and also upon the conditions of the distillation itself.

Moreover it should be noted that the distillation residues also comprise valuable materials, it being noted that the residues have quite high melting points and apparently contain substantial quantities of polymerized constituents.

Example 45

A portion of the $SO_2$ treated product of Example 1 above (i. e., of sample 1d mentioned in Table IVa) was recrystallized from hot ethanol. The recrystallized material had an acid number of 168, which compared with an acid value of 158 for the $SO_2$ treated material taken; and the recrystallized material had an iodine number of 65, as compared with an original iodine number of 70. A melting point determination made on the recrystallized material according to the Fisher-Johns Block method indicated a softening point at 83° and a melting point at 131°, which compares with a melting point of 63° C. by the Fisher-Johns Block method for the original $SO_2$ treated material.

Example 46

A portion of the $SO_2$ treated WW gum rosin product of Example 32 above (i. e., $SO_2$ treated at 320° C.) was saponified with sodium hydroxide, using a 25% aqueous sodium hydroxide solution. The amount of solution employed was sufficient to give 8.4% sodium hydroxide on the basis of the material taken for saponification.

The aqueous soap solution was subjected to an extraction with petroleum ether, thereby extracting the hydrocarbon present. The petroleum ether solution, after washing and evaporation of the solvent, yielded the hydrocarbon as a clear oil, this product having an acid number of 1.8 and an iodine number of 78.

The aqueous soap solution which was thus freed from the hydrocarbon constituent was acidified with acetic acid and the rosin acids precipitated. This precipitate was washed and dried, yielding a solid product with an acid number of 166, an iodine number of 39, and a melting point of 90° C.

In comparison with these values and those obtained for the hydrocarbon, the $SO_2$ treated material taken for saponification had an acid number of 118, an iodine number of 54, and a melting point of 65.5° C.

According to this example, it appears that both the hydrocarbons and also the acidic portion of the $SO_2$ treated and partially decarboxylated gum rosin were separated in relatively pure and stable form, by saponification of the acidic constituents present, followed by solvent extraction thereof.

Example 47

Fifty grams of $SO_2$ treated WW wood rosin, the product of Example 26 above, was added to 200 cc. of concentrated sulfuric acid with vigorous agitation. An ice-salt bath was used to keep the temperature below 0° C. After the sulfonation, the ice bath was removed and the mixture was stirred for one-half hour, the temperature rising to 13° C. The reaction mixture was then poured onto 900 grams of ice, the resulting product being thereafter filtered and washed with 300 cc. of cold distilled water. The sulfonic acid was then extracted from the precipitate with several portions of boiling distilled water, and filtered from the insoluble material. The total yield was 26.2 grams (52.4% by weight) of sulfonic acid.

The dried sulfonic acid was converted to dehydroabietic acid by hydrolyzing with 58% boiling sulfuric acid. The crude dehydroabietic acid was purified by decolorization and recrystallization. The product so obtained showed no depression of melting point when mixed with an authentic sample of dehydroabietic acid.

Example 48

Fifty grams of finely powdered $SO_2$ treated WW wood rosin of sample 1d above (Table IVa) was treated in accordance with Example 47. The total yield of sulfonic acid was 10.3 grams viz. 20.6% of the starting material.

The hot water-insoluble part of the initial sulfonation product was dissolved in ethyl alcohol, filtered, neutralized with sodium hydroxide and the resulting sodium soap separated from the neutral constituents by a petroleum ether extraction of the aqueous alcoholic layer. This procedure resulted in an acidic portion weighing 16.9 grams (33.8%), the neutral portion weighed 11.4 grams (22.8%). The acid portion of the water insoluble fraction had an acid number of 145, a Wijs iodine number of 158, and a Hübl iodine number of 83.6. The neutral portion had an acid number of 13, a Wijs iodine number of 80, and a Hübl iodine number of 46.7. This material had a saponification number of 60.

This example should be compared with Example 49 below which was performed on a sample of the same $SO_2$ treatment taken after a longer time of $SO_2$ treatment. Sample 1d was $SO_2$ treated for 5.5 hours whereas sample 1h (used in Example 49) was treated for 11.5 hours.

Example 49

Fifty grams of powdered $SO_2$ treated WW wood rosin of sample 1h above (Table IVa) was treated in accordance with Example 48. The yield of the sulfonic acid was 26.3 grams (52.6% by weight). The insoluble material obtained from the sulfonic acid extraction was separated into neutral and acidic constituents by treatment in ether solution with aqueous alkali. The neutral portion weighed 8.5 grams (17.0% based on the weight of starting material). It had an acid number of 4, a Wijs iodine number of 96, a Hübl iodine number of 54 and a saponification number of 42. The acidic portion amounted to 9.7 grams (19.4% based on weight of starting material). It had an acid number of 141, a Wijs iodine number of 104, and a Hübl iodine number of 58.

I claim:

1. In the treatment of abietyl compounds having at least some unsaturation in the molecule and having the general structure represented by the following formula:

Wherein:

D = either a single double bond or a conjugated system containing two double bonds A = a bivalent constituent selected from the class consisting of O, S, $H_2$, and NX; X being selected from the group consisting of hydrogen and monovalent organic radicals;

R = a monovalent constituent selected from the class consisting of O-metal, O-$NH_4$, halogen, OX, SX, NXX; X again being selected from the group consisting of hydrogen and monovalent organic radicals;

the step of stabilizing the compound which consists in introducing $SO_2$ gas as such into the compound and bubbling said $SO_2$ gas through the compound at a temperature above about 170° C. but not above the temperature at which there occurs extensive loss of the constituents A and R at the 1-position of the abietyl molecule under the conditions of the treatment.

2. A method in accordance with claim 1 in which the compound treated is a rosin acid.

3. A method in accordance with claim 1 in which the compound treated is a rosin ester.

4. A method in accordance with claim 1 in which the compound treated is a rosin salt.

5. In the treatment of rosin having at least some unsaturation in the molecule, the step of stabilizing the rosin which consists in introducing $SO_2$ gas as such into the rosin and bubbling said $SO_2$ gas through the rosin at a temperature between about 180° C. and 240° C., until the iodine value of the rosin is reduced below ¾ of that of the rosin taken for treatment.

6. In the treatment of a rosin acid having at least some unsaturation in the molecule, the method which comprises concurrently subjecting the rosin acid to treatment with an esterifying agent and to a stabilizing step which consists in introducing $SO_2$ gas as such into the mixture of rosin acid and esterifying agent and bubbling said $SO_2$ gas through said mixture at a temperature above about 170° C. but not above the temperature at which there occurs extensive loss of the oxygen-containing substituent at the 1-position of the rosin acid molecule under the conditions of the treatment.

7. In the treatment of a rosin acid having at least some unsaturation in the molecule, the method which comprises concurrently subjecting the rosin acid to treatment with a saponifying agent and to a stabilizing step which consists in introducing $SO_2$ gas as such into the mixture of rosin acid and saponifying agent and bubbling said $SO_2$ gas through said mixture at a temperature above about 170° C. but not above the temperature at which there occurs extensive loss of the oxygen-containing substituent at the 1-position of the rosin acid molecule under the conditions of the treatment.

NICHOLAS L. KALMAN.